United States Patent [19]
Weller

[11] Patent Number: 5,141,279
[45] Date of Patent: Aug. 25, 1992

[54] SIDE IMPACT PROTECTION APPARATUS

[75] Inventor: Peter A. Weller, Holland, Mich.

[73] Assignee: Davidson Textron Inc., Dover, N.H.

[21] Appl. No.: 763,549

[22] Filed: Sep. 23, 1991

[51] Int. Cl.⁵ .......................... B60J 5/04; B60R 21/02
[52] U.S. Cl. ................................ 296/146 D; 280/751;
296/189; 293/107
[58] Field of Search ................ 296/146, 189; 293/107;
280/751

[56] References Cited
U.S. PATENT DOCUMENTS

| | | | |
|---|---|---|---|
| 3,588,158 | 6/1971 | Ford | 293/107 |
| 3,829,141 | 8/1974 | Igwe | 293/107 |
| 3,989,275 | 11/1976 | Finch et al. | 280/751 |
| 5,040,335 | 8/1991 | Grimes | 296/189 |

FOREIGN PATENT DOCUMENTS 2238989  6/1991  United Kingdom ............... 280/751

OTHER PUBLICATIONS

DynaPad, Apr. 24, 1991.

Primary Examiner—Robert R. Song
Attorney, Agent, or Firm—John P. Moran

[57] ABSTRACT

A side impact protection apparatus for use on the inner panel of a vehicle door. The apparatus is a cushion including a hollow flexible skin having an inner wall secured to the inner panel, flexible ties between the skin and the inner wall or low density open-celled foam to prevent the skin from bulging, a rupturable diaphragm-covered orifice or a coupling having an extrudable elastomeric plug mounted therein connected to the inner wall, and a medium of air under pressure or hydraulic fluid or water or a polygel contained in the cushion and adaptable to discharge by rupturing the diaphragm or extruding the elastomeric plug when subjected to impact by the vehicle occupant in the event of a high force side impact against the vehicle.

13 Claims, 2 Drawing Sheets

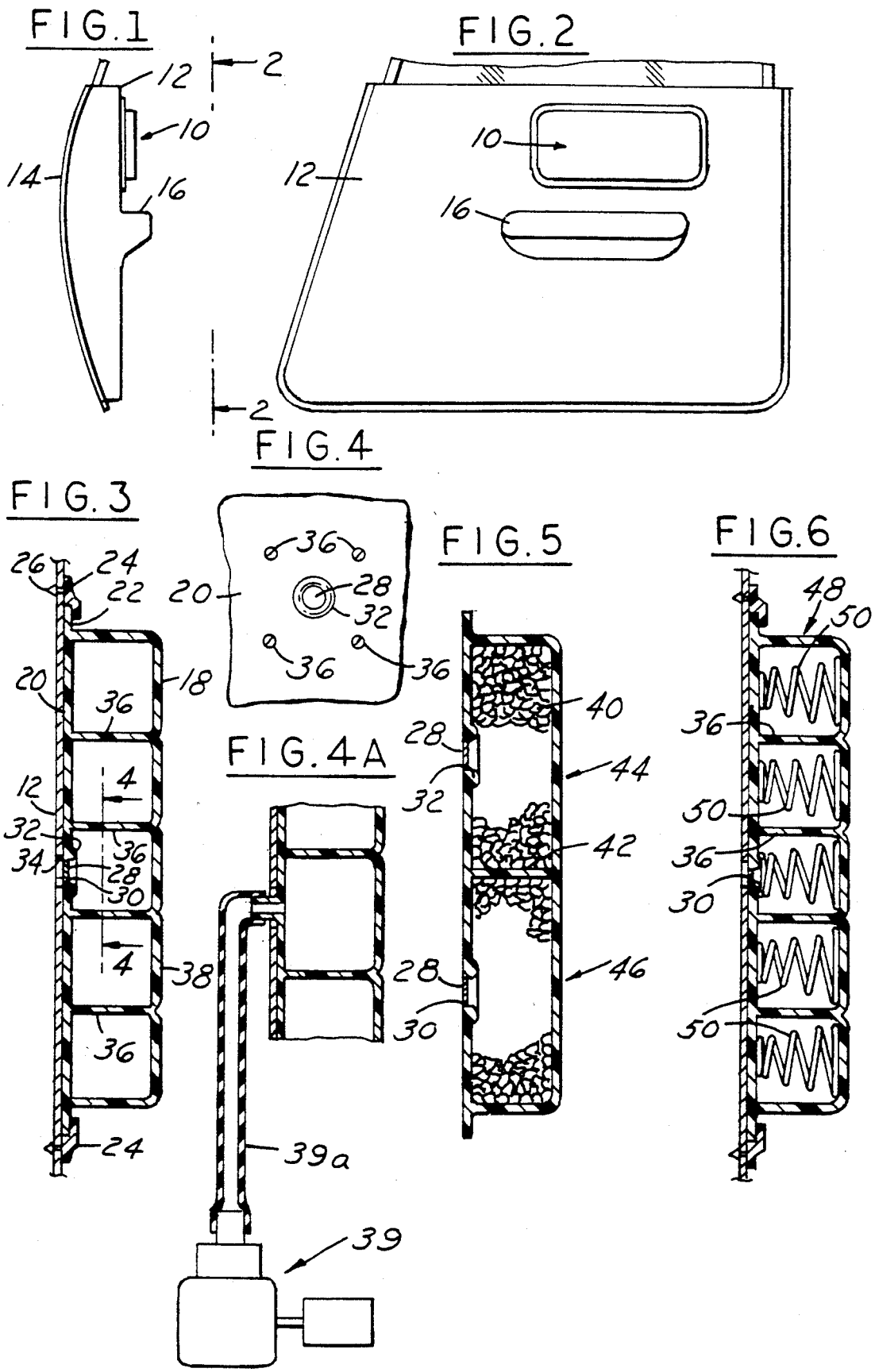

SIDE IMPACT PROTECTION APPARATUS

TECHNICAL FIELD

This invention relates generally to automotive side impact protection apparati and, more particularly, to improved cushioning on the door inner panel to protect the thorax area of the operator or passenger.

BACKGROUND ART

Heretofore, a multiplicity of cushion arrangements associated with automotive door inner panels have been known to provide protection for the occupants.

Lucas U.S. Pat. No. 2,877,049 discloses a series of sponge rubber scalloped pads of generally rectangular shape on a backing member which is connected to straps adapted to be removably mounted over window to serve as an arm rest.

Lagace U.S. Pat. No. 3,185,497 discloses a C-shaped, air inflatable element mounted adjacent the rear edge of a vehicle door, with the lower leg of the C-shape thereof positioned below the usual door arm rest.

Finch et al U.S. Pat. No. 3,989,275 discloses a door trim pad moulding of rigid plastics foam covered with a layer of semi-rigid plastics foam. The rigid plastics foam portion is formed to include a plurality of integral projections forming discrete cavities, with the projections adapted to collapse on impact.

Schmid U.S. Pat. No. 4,272,103 discloses a flank protection arrangement having a first compressible reinforcement member within the vehicle door, a second one comprising an impact cushion of any suitable known type mounted on the door inner wall lateral of the first member and adjacent the driver's pelvic area, and a third one above the other two adjacent the shoulder and chest area.

Welch U.S. Pat. No. 4,783,114 discloses energy absorbent sections of molded foam positioned between the inner door panel and a trim panel above and below a cavity adjacent an arm rest which is yieldably mounted on the trim panel, and adaptable to collapse into the cavity when contacted by an occupant in the event of a side impact.

An Automotive Technologies International, Inc. article entitle "Improved Padding to Reduce Injuries in Automobile Accidents" discloses a padding composed of two interleaved units, each containing pluralities of wedge shaped, rectangular cross-section segments joined together to form closed cells filled with air, with each cell containing an orifice and blowout patch for the air to escape upon impact against the padding by the occupant resulting from a side impact against the vehicle. The preferred padding includes springs mounted in the cells.

DISCLOSURE OF THE INVENTION

A general object of the invention is to provide an improved automotive side impact protection apparatus.

Another object of the invention is to provide an improved cushion arrangement adapted to being mounted on the inner door panel in the area adjacent the occupant's thorax or pelvis.

A further object of the invention is to provide a hollow flexible skin molded in the shape of a cushion and containing air at or above atmospheric pressure, with a diaphragm-covered orifice formed on the outer side thereof. Flexible ties or low density, totally open celled foam inside the hollow skin prevent the latter from bulging under the air pressure, or the cushion may be divided by one or more thin flexible walls into two or more cells wherein a multiplicity of walls and cells will prevent bulging.

Still another object of the invention is to alternately provide the hollow flexible skin or cells with an open orifice or orifices and a small electric or engine driven pump operatively connected thereto to provide sufficient flow to compensate for loss of air through the orifice.

A still further object of the invention is to provide an alternate arrangement including a hollow flexible skin with open orifice(s), wherein light conical shaped coil springs are mounted inside the skin to push the skin outwardly to draw air in through the open orifice(s).

Still another object of the invention is to provide a hollow flexible skin filled with a hydraulic fluid or a polygel, and an outlet tube extending therefrom through an opening in the door. An orifice bushing is mounted in the inner end of the outlet tube, and an extrudable elastomeric plug is mounted in the outer end of the outlet tube adjacent a nipple opening. Upon impact, the fluid or polygel causes the plug to extrude through the nipple opening, with the fluid or polygel being dispersed, either into a reservoir or into the door cavity.

These and other objects and advantages will become more apparent when reference is made to the following drawings and the accompanying description.

BRIEF DESCRIPTION OF THE DRAWINGS

FIG. 1 is an end view of a vehicle door embodying the invention;

FIG. 2 is a side view taken along the plane of the line 2—2 of FIG. 1, and looking in the direction of the arrows;

FIG. 3 is an enlarged cross-sectional view of the inventive portion of FIG. 1;

FIG. 4 is a fragmentary view taken along the plane of the line 4—4 of FIG. 3, and looking in the direction of the arrows;

FIG. 4A is a fragmentary portion of the FIG. 3 structure illustrating an alternate embodiment of the invention;

FIG. 5 and 6 are views similar to FIG. 3, illustrating alternate embodiments of the invention.

BEST MODE OF CARRYING OUT THE INVENTION

Figure 7:
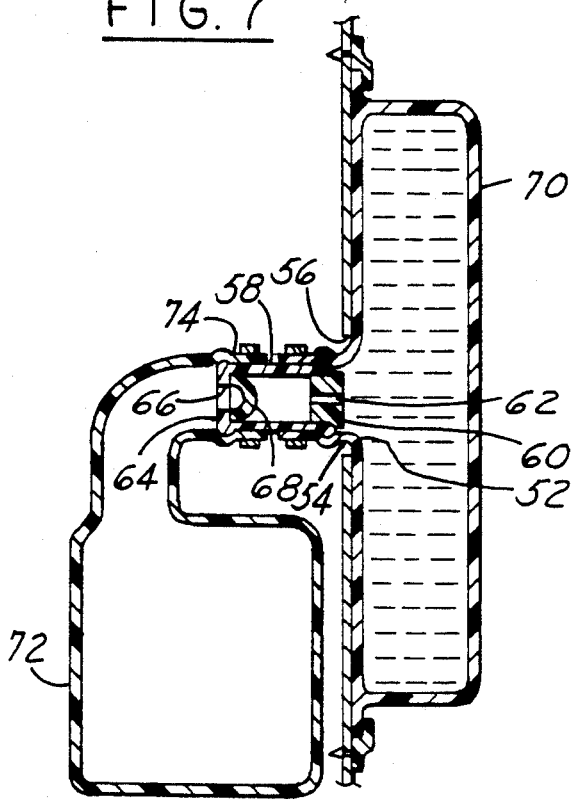
FIG. 7-9 are cross-sectional views of three additional alternate embodiments of the invention.

Referring now to the drawings in greater detail, FIGS. 1 and 2 illustrate a side impact cushion arrangement 10 mounted on an inner panel 12 of a vehicle door 14, just above the conventional arm rest 16 adjacent the thorax area of the vehicle occupant. A similar cushion could be placed just below the armrest in the pelvis area.

As shown in FIG. 3, the side impact cushion arrangement 10 includes a hollow flexible skin 18 having an inner wall 20 mounted against the inner panel 12, with a peripheral flange 22 retained by a bracket or frame 24 secured to the inner panel by snap fasteners 26.

A diaphragm 28 is mounted in an orifice 30 formed in the inner wall 20, within a ring-shaped reinforcing bead 32 integrally formed on the wall 20. The diaphragm 28 is positioned adjacent an opening 34 formed in the inner panel 12 of the door 14.

The hollow flexible skin 18 is filled with air at or above atmospheric pressure. A plurality of flexible ties 36 (FIGS. 3 and 4) are formed within the hollow flexible skin 18 between the outer 38 and inner 20 walls thereof to prevent the skin 18 from bulging under the air pressure. Alternatively, as shown in FIG. 4A, the orifice 30 may be left open, i.e., no diaphragm 28 and a small electric or engine driven pump 39 may be operatively connected to the interior of the hollow flexible skin 18 by a tube 39a secured to an outlet tube 39b.

As shown in FIG. 5, a low density, totally open celled foam 40 may be used in lieu of the flexible ties 36 of FIG. 3 to prevent the skin 18 from bulging under the air pressure. If desired, one or more walls 42 may be used to divide the cushion arrangement 10 into two or more smaller segments 44 and 46, each with a diaphragm 28 covered orifice 30. With a multiplicity of walls, the walls will serve to prevent bulging of the overall cushion, in which case, neither ties 36 nor foam 40 are necessary.

FIG. 6 illustrates a cushion arrangement 48 similar to FIG. 3, with the orifice 30 being left open by virtue of no diaphragm 28 being mounted therein, and with conical shaped coil springs 50 mounted between adjacent flexible ties 36. The springs 50 serve to push the flexible skin 18 outwardly, drawing air in through the orifice 30 to maintain the cushion filled with air. In the event of a heavy impact, the springs 50, being conical in shape, will compress to a one wire thickness.

In FIG. 7, the inner wall 52 is formed to include an outlet tube 54 extending through an opening 56 formed in the inner panel 12 of the vehicle door 14. A coupling 58 is mounted in the outlet tube 54. A bushing 60, including a predetermined orifice 62 therethrough, is mounted in the inner end of the coupling 58. A flange 64 at the outer end of the coupling 58 forms a central opening 66. An extrudable elastomeric plug 68 is mounted in the tube 54, abutting against the flange 64.

A cushion 70 is filled with a hydraulic fluid consisting of any suitable material from water to a polygel. The latter is a jellylike solid which becomes fluid when extruded through an orifice under high pressure. Accordingly, in the event of a severe side impact causing the occupant, in turn, to impact the cushion 70, the water or polygel is forced through the orifice 62 and then extrudes the plug 68 through the central opening 66, to discharge. The discharged fluid may discharge into a reservoir 72 secured by a connector 74 to the coupling 58, or, if preferred, into the door cavity itself inasmuch as such a discharge would occur only in the event of a severe impact which would demolish the door 14.

Figure 8:
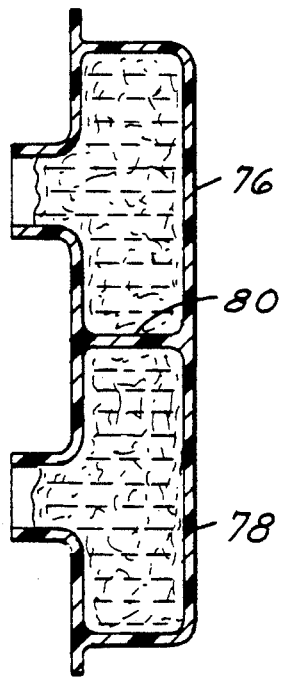

As in the case of the FIG. 5 structure, the hydraulic fluid-filled arrangement may be divided into two (or more) cells 76 and 78, as shown in FIG. 8, separated by a wall 80.

Figure 9:
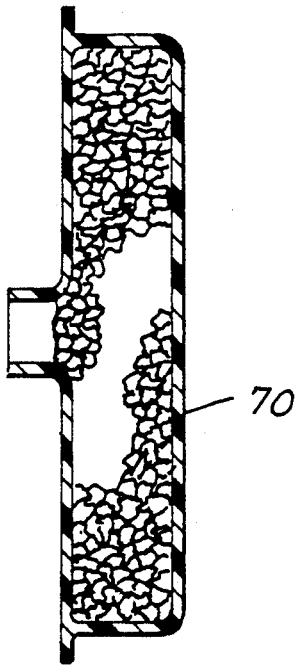

As shown in FIG. 9, the cushion 70 may be filled with the low density, open celled foam 40, as in the FIG. 5 embodiment.

INDUSTRIAL APPLICABILITY

It should be apparent that the invention provides a compact, efficient side impact protection apparatus.

It should also be apparent that the hollow flexible skin may be filled with either air at or above atmospheric pressure or various hydraulic fluids when completely enclosed, or may contain conical springs for assuring the inclusion of ambient air when an orifice remains open.

Filling the hollow flexible skin 18 with very low density fully open celled foam will not only restrain bulging under pressure but will provide internal restoring forces for assuring the inclusion of ambient air when the orifice(s) remain open in a manner similar to the conical springs arrangement of FIG. 6.

While several embodiments of the invention have been shown and described, other modifications thereof are possible within the scope of the following claims.

The embodiments of the invention in which an exclusive property or privilege is claimed are defined as follows.

1. For use on the inner panel of a vehicle door, a side impact protection apparatus comprising a cushion including an outer hollow flexible skin having an inner wall secured to the inner panel of said door, means included within said cushion to prevent said hollow flexible skin from bulging, outlet means formed in said inner wall, a rupturable closure means integrally mounted in said outlet means, and a medium confined within said cushion from among the group including air at or above atmospheric pressure, hydraulic fluid, including water, and a polygel, each adaptable to rupture said rupturable closure means and discharge through said outlet means upon being impacted by the vehicle occupant in the event of a severe side impact against the door.

2. The side impact protection apparatus described in claim 1, wherein said means to prevent bulging consists of flexible ties between the hollow flexible skin and the inner wall.

3. The side impact protection apparatus described in claim 1, wherein said means to prevent bulging consists of a low density, totally open-celled foam.

4. The side impact protection apparatus described in claim 1, wherein said means to prevent bulging consists of a multiplicity of flexible walls dividing the cushion into separate cells.

5. The side impact protection apparatus described in claim 1, wherein said outlet means is an orifice.

6. The side impact protection apparatus described in claim 5, wherein said rupturable closure means is a diaphragm mounted in said orifice.

7. The side impact protection apparatus described in claim 1, wherein said outlet means includes an outlet tube formed outwardly on said inner wall, a coupling secured in said outlet tube, an orifice bushing mounted in the inner end of said coupling, and a radially inwardly extending flange formed on the outer end of said coupling forming a central opening therein.

8. The side impact protection apparatus described in claim 7, wherein said rupturable closure means is an extrudable elastomeric plug mounted in said coupling against said flange adapted to extrude through said opening under the force of said medium upon a severe impact against said outer flexible skin.

9. The side impact protection apparatus described in claim 1, wherein said medium is air at or above atmospheric pressure.

10. The side impact protection apparatus described in claim 1, wherein said medium is a hydraulic fluid.

11. The side impact protection apparatus described in claim 1, wherein said medium is a polygel consisting of a jellylike solid which becomes fluid when extruded through said outlet means.

12. The side impact protection apparatus described in claim 7, and a reservoir operatively connected to said coupling.

13. The side impact protection apparatus described in claim 5, and a ring-shaped reinforcing bead formed around said orifice.

* * * * *